INVENTORS.
P. J. NAQUIN, Jr.
J. P. LINDSEY
BY
Hudson & Young
ATTORNEYS.

United States Patent Office

3,216,523
Patented Nov. 9, 1965

3,216,523
SEISMIC PROSPECTING
Paul J. Naquin, Jr., and Joe P. Lindsey, Bartlesville, Okla., assignors to Phillips Petroleum Company, a corporation of Delaware
Filed Sept. 8, 1960, Ser. No. 54,780
5 Claims. (Cl. 181—.5)

This invention relates to seismic prospecting and to the interpretation of seismic signals.

As is well known, seismic surveying is a valuable procedure for measuring depths and slopes of subterranean formations. This information is particularly useful in locating oil deposits. A common method of seismic surveying involves impart ing vibrations to the earth and measuring reflected vibrations that are subsequently received at the surface of the earth at locations spaced from the point at which the vibrations were imparted to the earth. By measuring the times of arrival of reflected vibrations in a plurality of records, it is possible to obtain information regarding the slope of subterranean reflecting formations. However, the identification of these reflected vibrations is ofen exceedingly difficult because random noise vibrations are present in the records which tend to obscure the desired reflections.

Various procedures have been devised for processing seismic records so as to be able to recognize the desired reflections in the presence of random noise vibrations. One procedure that is particularly useful in many locations involves summing a plurality of individual records. The common reflections are added, whereas noise vibrations which occur at random times tend to cancel one another. However, this procedure requires that the individual records be adjusted with respect to one another so that common reflections occur at the same time and are added. The initial adjustment of the records in this manner is sometimes difficult because of the number of corrections that must be made. If the seismometers are positioned different distances from the shot points, corrections must be made for the different lengths of travel paths of the reflected vibrations. If the seismometers are located at different elevations, corrections must be made for this factor. In many areas, the weathered layer near the surface of the earth often varies in thickness so that the travel times of different reflected vibrations depend upon the distances they travel through this weathered layer. For these reasons, the initial adjustment of the records to eliminate possible errors due to the above mentioned factors, is often difficult.

The present invention provides a novel procedure for correlating seismic records in such a manner that common reflections appear at the same time in a resulting composite record. This is accomplished by means of a cross-correlation procedure. First and second seismic signals to be correlated are multiplied by one another and the resulting product is integrated. This procedure is repeated a number of times with the initial records displaced varying amounts from one another. The integrated products exhibit a maximum when the signals are most nearly correlated with one another. The original signals are then displaced from one another in accordance with the displacement that produces the best correlation and are then added to provide a composite record. This procedure thus compensates for all of the individual corrections that previously had been considered separately, and produces a composite record without the operator needing to know each individual correction. Novel apparatus is also provided in accordance with this invention for carrying out this correlation procedure.

Accordingly, it is an object of this invention to provide a method of seismic prospecting wherein common reflections in a plurality of seismic records are identified.

Another object os to provide an improved method of seismic prospecting for identifiying subterranean reflecting formations.

A further object is to provide apparatus for use in correlating seismic signals.

Other objects, advantages and features of the invention should become apparent from the following detailed description, taken in conjunction with the accompanying drawing in which.

Figure 1:
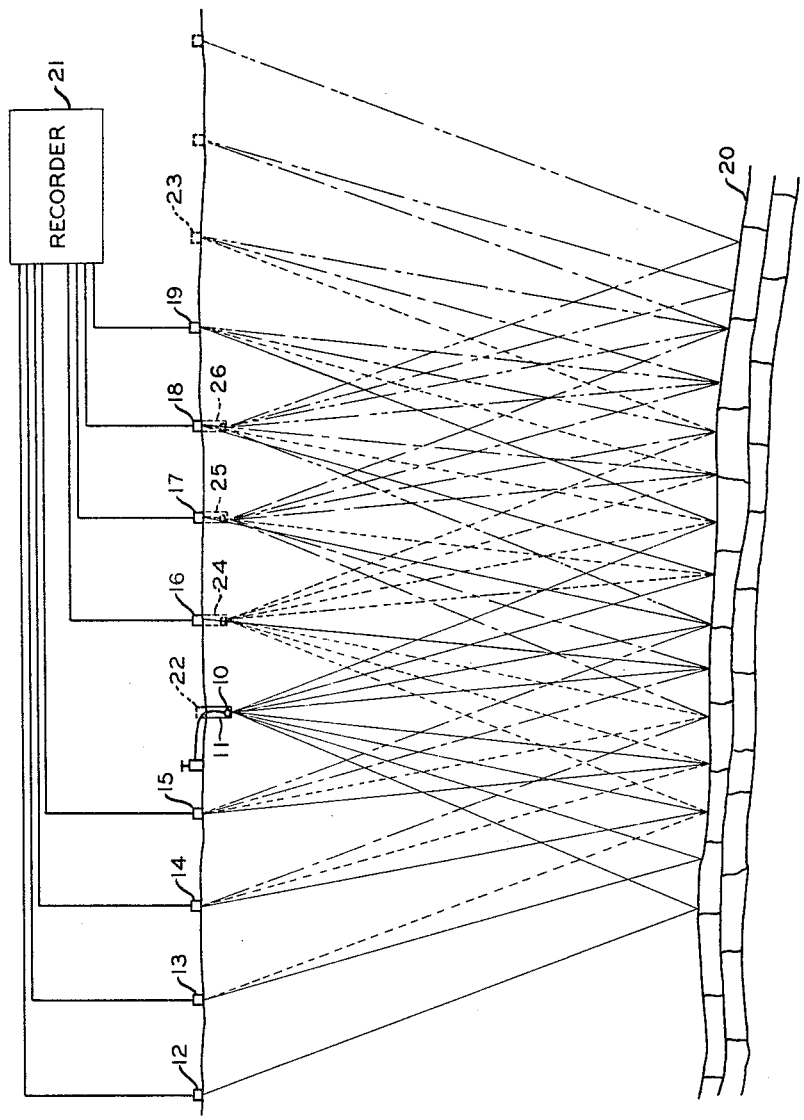
FIGURE 1 is a schematic representation of a seismic exploring procedure which can be employed to carry out the method of this invention.

Referring now to the drawing in detail and to FIGURE 1 in particular, an explosive charge 10 is detonated in a shot hole 11 adjacent the surface of the earth. The resulting vibrations are received at a plurality of seismometers 12, 13, 14, 15, 16, 17, 18 and 19 which are positioned at the surface of the earth on both sides of shot hole 11. The distances between adjacent seismometers are equal and equal to the distance the closest seismometers are positioned to the shot hole. As can be seen from the drawing, vibrations travel downwardly from shot hole 11 and are reflected back to the surface of the earth from a subterranean reflecting bed 20. The vibrations received by the several seismometers are recorded by a multichannel recorder 21, which preferably is a magnetic tape recorder. Thereafter, seismometers 12 and 16 are removed and additional seismometers 22 and 23 are positioned, as shown. An explosive charge is then detonated in a shot hole 24 which is positioned in the location originally occupied by seisomometer 16. The resulting vibrations received by the eight seismometers then employed are separately recorded by recorder 21. Thereafter, explosive charges are detonated in sequence in shot holes 25 and 26. Four seismometers are positioned on each side of each of the shot holes to record the resulting vibrations.

From an inspection of the drawing it can be seen that a plurality of vibrations are reflected from common points on reflecting bed 20. In accordance with this invention, it is desirable to combine the recorded vibrations in such a manner that vibrations reflected from common reflecting beds are superimposed in the resulting composite record. While a total of eight seismometers has been illustrated in conjunction with each shot hole for simplicity, it should be evident that additional seismometers can be employed to obtain more reflected vibrations from each shot hole. In normal operations, a substantially larger number of seismometers is employed.

Figure 2:
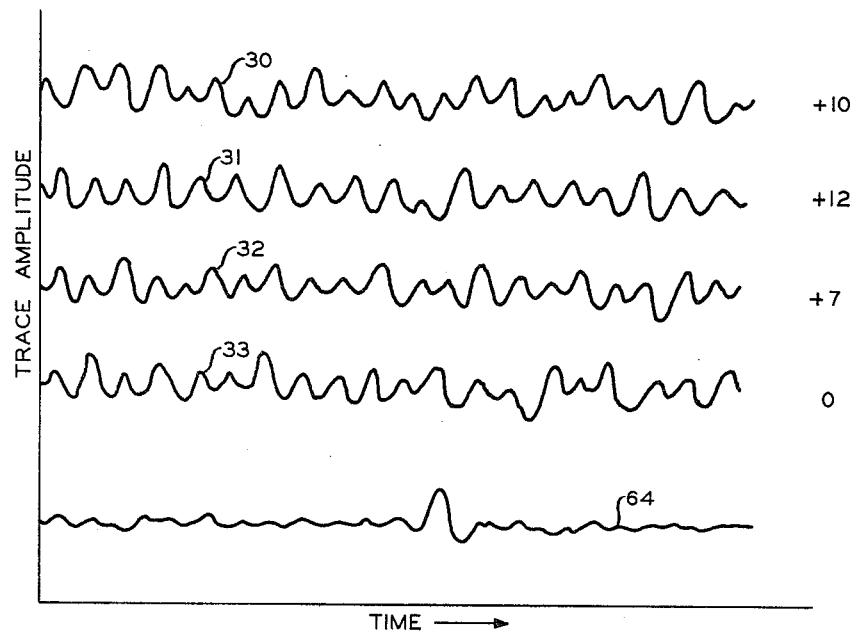
FIGURE 2 is a graphical representation of typical seismic records and a composite record produced by the method of this invention.

Curves 30, 31, 32 and 33 of FIGURE 2 are graphical representations of typical recorded vibration patterns that are received by the several seismometers. While these records may contain common reflections from bed 20, the reflections can not readily be identified because of the large amount of random noise vibrations also present in the records. As previously discussed, the common reflections generally do not appear at the same time in the several records because of differences in travel paths, elevation, and thickness of the weathered layer.

The first step of the procedure of this invention is to measure the degree of correlation between two of the recorded seismic signals. This can be accomplished by means of the apparatus illustrated in FIGURE 3. The first signal, which can represent curve 33 of FIGURE 2, for example, is applied to an input terminal 35 which is connected to the first input of a multiplier 36. The second signal, which can be the vibrations represented by curve 32 of FIGURE 2, for example, is applied to a second input terminal 37. Terminal 37 is connected through a modulator 38 to a recording head 39 that is positioned adjacent a magnetic tape 40. A reproducing head 41 is also positioned adjacent tape 40 and is connected through a demodulator 42 to the second input of multiplier 36. The output of multiplier 36 is connected to the input of a signal integrator 43. The output of integrator 43 is applied to a recorder 44.

Recording tape 40 extends around a pair of pulleys 46 and 47, and is driven by a drive wheel 48 which is connected to a motor 49. The tape moves from recording head 39 over pulley 46 to reproducing head 41. The tape then passes over pulley 47 and past an erasing head 50 which eliminates the previously recorded signal. A spring 51 extends between pulley 47 and a fixed support 52 so as to tend to pull pulley 47 downwardly. A rod 53 extends upwardly from pulley 46. This rod has an extension thereon which is adapted to be engaged by a fixed ratchet 54. Thus, the vertical position of the pulley assembly can readily be adjusted to vary the length of tape between recording head 39 and reproducing head 41. This serves to adjust the time the input signal from terminal 37 is delayed before being applied to multiplier 36.

Figure 3:
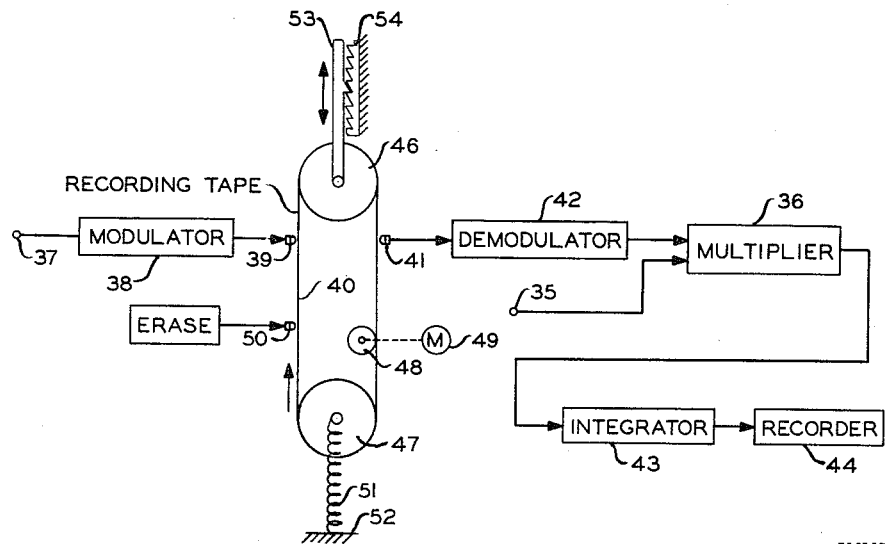
FIGURE 3 is a schematic representation of a first embodiment of the correlating apparatus of this invention.
Figure 4:
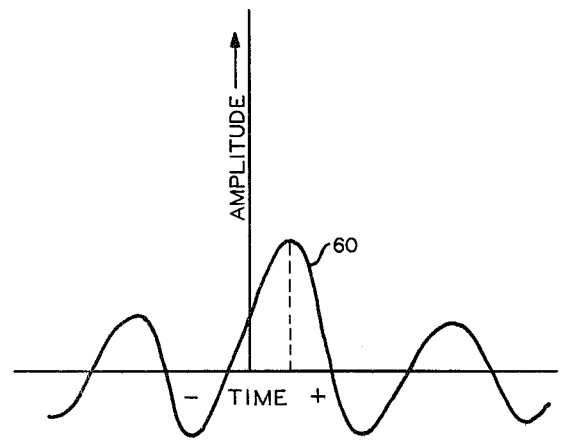
FIGURE 4 is a graphical representation of a correlation signal produced in accordance with this invention.

The two signals applied to the apparatus of FIGURE 3 are thus multiplied, integrated and recorded, after one is delayed with respect to the other. A curve of the type shown in FIGURE 4 is plotted wherein the amplitude of the integrated outputs are plotted as a function of various delay times of the tape between the recording and reproducing heads, shown as positive in FIGURE 4. The negative times of FIGURE 4 are obtained by reversing the two input signals applied to terminals 35 and 37. A curve of the type shown in FIGURE 4 is drawn from the several integrator outputs. For most seismic work, the delay times selected can be of the order of 0 to 30 milliseconds. When the two signals are most nearly correlated with one another, the curve 60 of FIGURE 4 represents a maximum. The time, shown as a dotted line in FIGURE 4, at which this maximum occurs represents the time difference that common reflections are displaced from one another in the two input signals. This difference is of the order of seven milliseconds, for example, between curves 32 and 33 of FIGURE 2.

The foregoing procedure is then repeated with curves 33 and 31 of FIGURE 2 being applied as the respective inputs to the correlating apparatus of FIGURE 3. Thereafter, the same procedure is again followed to determine the correlation between curves 30 and 33. As illustrated in FIGURE 2, these latter two correlations may occur at 12 and 10 milliseconds, respectively. Alternatively, any two of the curves can be correlated with one another to obtain the displacement therebetween.

Figure 5:
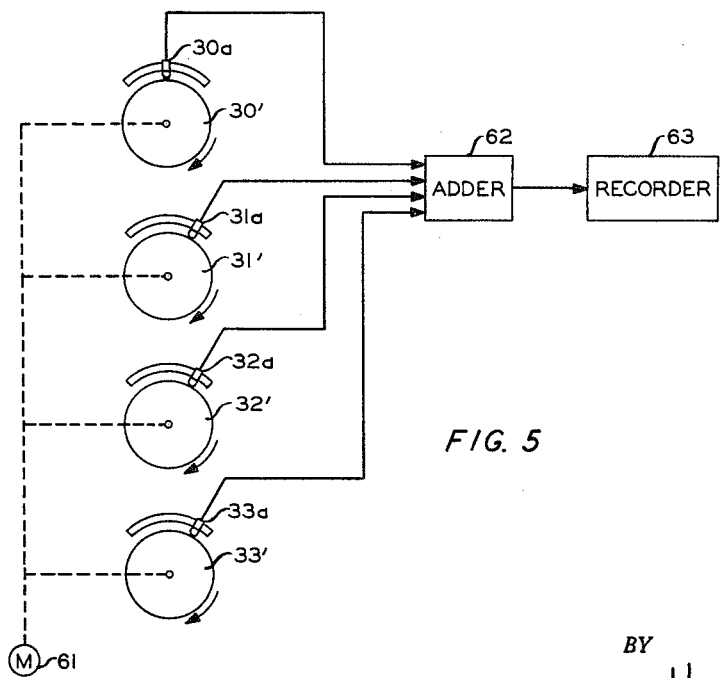
FIGURE 5 is a schematic representation of apparatus which can be employed to obtain a composite signal.

After the time displacements between the individual signals have been determined, the curves 30, 31, 32 and 33 of FIGURE 2 are displaced from one another by these times so that common reflection patterns appear at the same times in the individual curves. The curves are then summed. This can be accomplished by the apparatus illustrated in FIGURE 5. The curves 30, 31, 32 and 33 of FIGURE 2 are recorded on respective drums 30', 31', 32' and 33'. These drums are all rotated at a constant speed by means of a motor 61. Reproducing heads 30a, 31a, 32a and 33a are adjustably positioned adjacent respective drums 30', 31', 32' and 33', and are displaced from one another by amounts representative of the displacement times shown for the curves of FIGURE 2. Each of the reproducing heads of FIGURE 5 is connected to a respective input of an adder 62, the output of which is applied to a recorder 63. In this manner, the four curves are summed to produce a composite curve of the shown by curve 64 of FIGURE 2. It can be seen that common reflections are added and that random noise vibrations are reduced because they tend to cancel one another.

Figure 6:
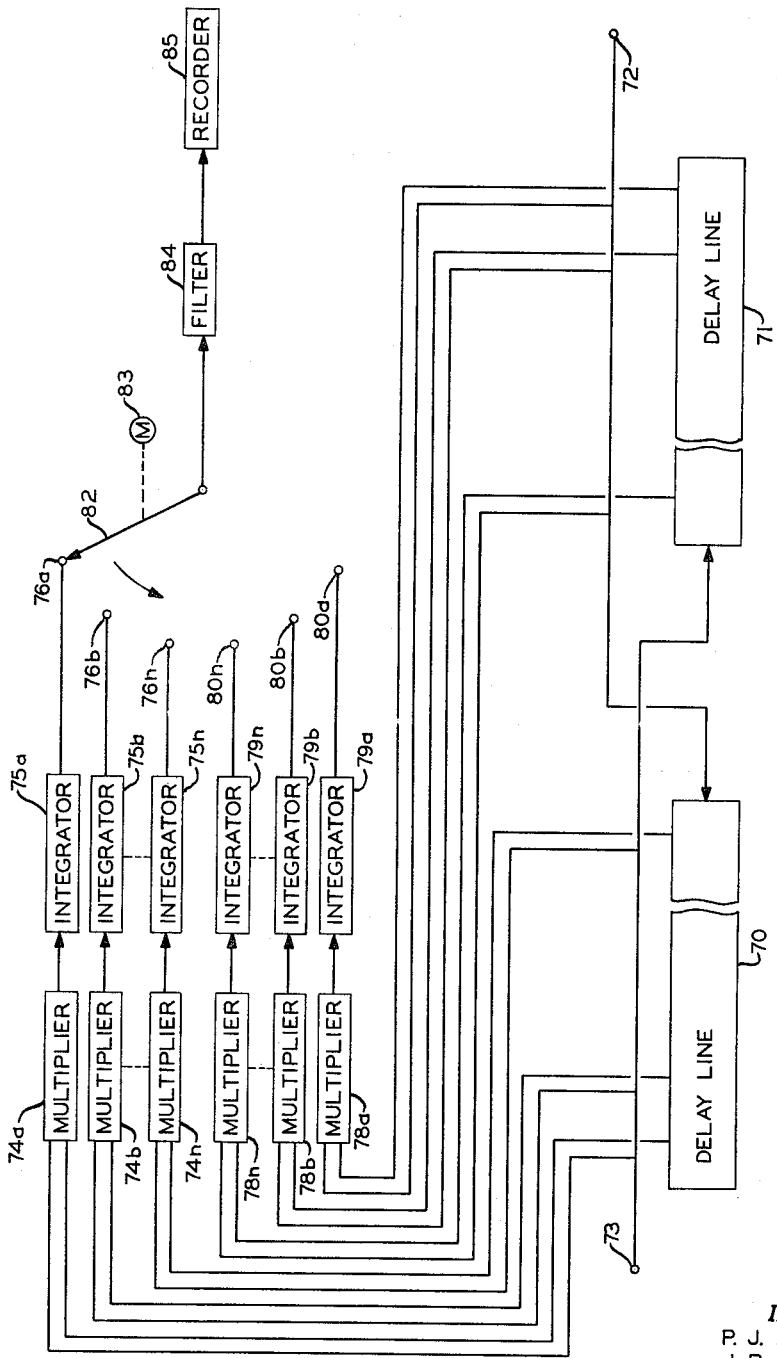
FIGURE 6 is a schematic representation of a second embodiment of the correlation apparatus of this invention.

A second embodiment of the correlation apparatus of this invention is illustrated in FIGURE 6. The apparatus of FIGURE 6 includes two signal delay lines 70 and 71 which have respective input terminals 72 and 73. One of the signals to be correlated is applied to terminal 73, and the second signal is applied to terminal 72. The delay lines are provided with a plurality of outputs to provide a plurality of output signals which represent sequential values of the respective input signals. These delay lines can be moving magnetic tapes or they can be conventional electrical delay lines, for example. Input terminal 73 and the last output of delay line 70 are applied as the respective inputs to a multiplier 74a. The output of multiplier 74a is applied through an integrator 75a to a terminal 76a. Input terminal 73 and the remainder of the outputs of delay line 70 are applied as respective inputs to a series of multipliers 74b . . . 75n.

The outputs of multipliers 74b . . . 74n are applied through respective integrators 75b . . . 75n to respective terminals 76b . . . 76n. Similarly, input terminal 72 and the outputs of delay line 71 are applied as the respective inputs to a plurality of multipliers 78a, 78b . . . 78n. The outputs of multipliers 78a, 78b . . . 78n are applied through respective integrators 79a, 79b . . . 79n to respective terminals 80a, 80b . . . 80n. A switch 82 is rotated by a motor 83 to engage the terminals in sequence. Switch 82 is connected through a filter 84 to a recorder 85.

The apparatus illustrated in FIGURE 6 automatically provides records of the type shown in FIGURE 4. Switch 82 scans terminals 76a, 76b . . . 76n, 80n . . . 80b and 80a in sequence which effectively varies the time one of the signals is delayed with respect to the other prior to being multiplied. Filter 84 can be any type of smoothing filter so that the recorded signal is in the form of a smooth curve.

In view of the foregoing description it can be seen that there is provided in accordance with this invention a novel procedure and apparatus for measuring correlation between two signals and for identifying common patterns in two signals. While the invention has been described in conjunction with present preferred embodiments, it should be evident that it is not limited thereto.

What is claimed is:

1. Apparatus for use in interpreting seismic signals comprising first and second signal delay means having respective inputs adapted to receive seismic signals, each of said delay means having a plurality of outputs to provide output signals representative of the respective input seismic signals at progressively later times; a plurality of first and second signal multipliers, each having first and second inputs; means connecting the first inputs of said first multipliers to the input of said second delay means; means connecting the second inputs of said first multipliers to respective outputs of said first delay means; means connecting the first inputs of said second multipliers to the input of said first delay means; means connecting the second inputs of said second multipliers to respective outputs of said second delay means; a plurality of signal integrating means; and means connecting the inputs of said integrating means to the respective outputs of said multiplying means.

2. The apparatus of claim 1 wherein said delay means comprise electrical delay lines.

3. The apparatus of claim 1, further comprising a recorder, and switching means to connect the input of said recorder selectively to the respective outputs of said integrating means.

4. The apparatus of claim 3, further comprising means to actuate said switching means so that the outputs of said integrating means are connected to the input of said recorder in sequence.

5. Apparatus in accordance with claim 1 further comprising means for applying a first seismic signal to the input of said first signal delay means, means for applying a second seismic signal to the input of said second signal delay means, and means for summing said first and second seismic signals wherein one is displaced relative to the other by an amount representative of the delay between said first seismic signal and said second seismic signal corresponding to the inputs of the multiplier having the maximum output.

References Cited by the Examiner

UNITED STATES PATENTS

| | | | |
|---|---|---|---|
| 2,259,478 | 10/41 | Morgan | 181—0.5 |
| 2,676,206 | 4/54 | Bennett et al. | |
| 2,688,124 | 8/54 | Doty et al. | 181—0.5 |
| 2,794,966 | 6/57 | McCarty | 181—0.5 |
| 2,808,577 | 10/57 | Crawford et al. | 181—0.5 |
| 2,907,400 | 10/59 | Swafford | 340—15.5 X |
| 2,921,738 | 1/60 | Greening. | |
| 2,928,071 | 3/60 | Feagin et al. | 340—15.5 |
| 2,949,974 | 8/60 | Beuermann | 181—0.5 |
| 2,989,726 | 6/61 | Crawford et al | 340—15.5 |
| 2,991,447 | 7/61 | Winterhalter et al. | 181—0.5 |
| 3,023,966 | 3/62 | Cox et al. | 343—100.7 |
| 3,036,775 | 5/62 | McDermid et al. | 343—100.7 X |
| 3,065,453 | 11/62 | Doty | 340—15.5 |
| 3,096,501 | 7/63 | Williams | 340—15.5 |

BENJAMIN A. BORCHELT, *Primary Examiner.*

CHARLES W. ROBINSON, KATHLEEN CLAFFY, SAMUEL FEINBERG, *Examiners.*